United States Patent
Liu et al.

(10) Patent No.: US 8,621,933 B2
(45) Date of Patent: Jan. 7, 2014

(54) TESTING APPARATUS

(75) Inventors: Yu-Lan Liu, Wuhan (CN); Wei-Min Qin, Wuhan (CN); Yu-Lin Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 50 days.

(21) Appl. No.: 13/474,812

(22) Filed: May 18, 2012

(65) Prior Publication Data

US 2013/0145855 A1    Jun. 13, 2013

(30) Foreign Application Priority Data

Dec. 9, 2011    (CN) .......................... 2011 1 0408400

(51) Int. Cl.
*G01L 1/00*    (2006.01)
*G01B 5/30*    (2006.01)
*G01B 7/16*    (2006.01)
*G01N 3/00*    (2006.01)

(52) U.S. Cl.
USPC .......................................... 73/760; 73/865.9

(58) Field of Classification Search
USPC ................................ 73/760, 826, 866.5, 865.9
See application file for complete search history.

(56) References Cited

U.S. PATENT DOCUMENTS

| | | | |
|---|---|---|---|
| 2008/0282767 A1* | 11/2008 | Ido ................................ | 73/11.01 |
| 2013/0145860 A1* | 6/2013 | Qin et al. ........................ | 73/826 |
| 2013/0167670 A1* | 7/2013 | Liu ................................ | 73/865.9 |
| 2013/0168520 A1* | 7/2013 | Liu ................................ | 248/327 |

\* cited by examiner

*Primary Examiner* — Lisa Caputo
*Assistant Examiner* — Jamel Williams
(74) *Attorney, Agent, or Firm* — Altis Law Group, Inc.

(57) ABSTRACT

A testing apparatus includes a securing member, a first clipping panel, a second clipping panel, two mounting members, and a sliding member. The securing member includes a screw pole. The first clipping panel is secured to the screw pole. The second clipping panel is moveably attached to the screw pole, and the first clipping panel and the second clipping panel are attached to opposite side plates of an electronic device. The two mounting members are attached to the screw pole and located on opposite sides of the second clipping panel, for preventing the second clipping panel from disengaging from the electronic device. The sliding member is slidably attached to the screw pole and located between the first clipping panel and the second clipping panel, for moving the electronic device.

20 Claims, 4 Drawing Sheets

TESTING APPARATUS

BACKGROUND

1. Technical Field

The present disclosure relates to a testing apparatus.

2. Description of Related Art

Electronic apparatus, such as computers, need to go through various tests, such as a vibration test or an impact test. A vibration absorbing plastic gasket is attached to a bottom plate of the computer, for absorbing the vibration generated by the computer. The vibration absorbing plastic gasket is tested to ensure the stability of the computer. When the vibration absorbing plastic gasket is tested, the computer is placed on a testing desk. A tension meter is engaged in a hole of a front plate of the computer, to move the computer relative to the testing desk. However, if there is no hole defined in the front plate, the tension meter cannot be engaged with the computer. Therefore, an improved testing apparatus may be needed within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
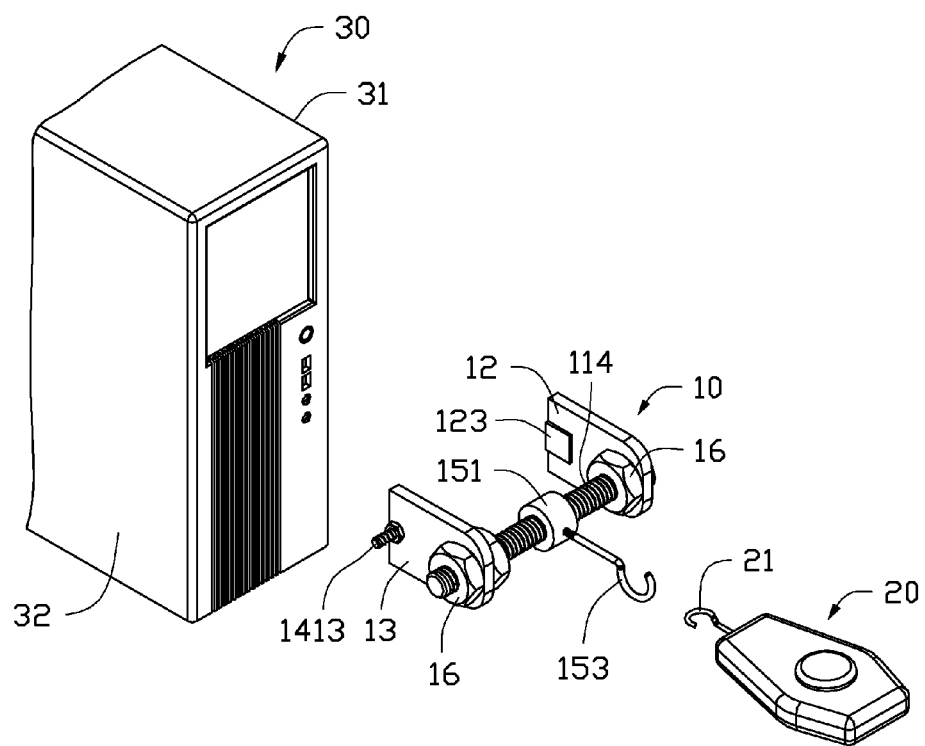
FIG. 1 is an exploded, isometric view of a testing apparatus and an electronic device in accordance with an embodiment.
Figure 2:
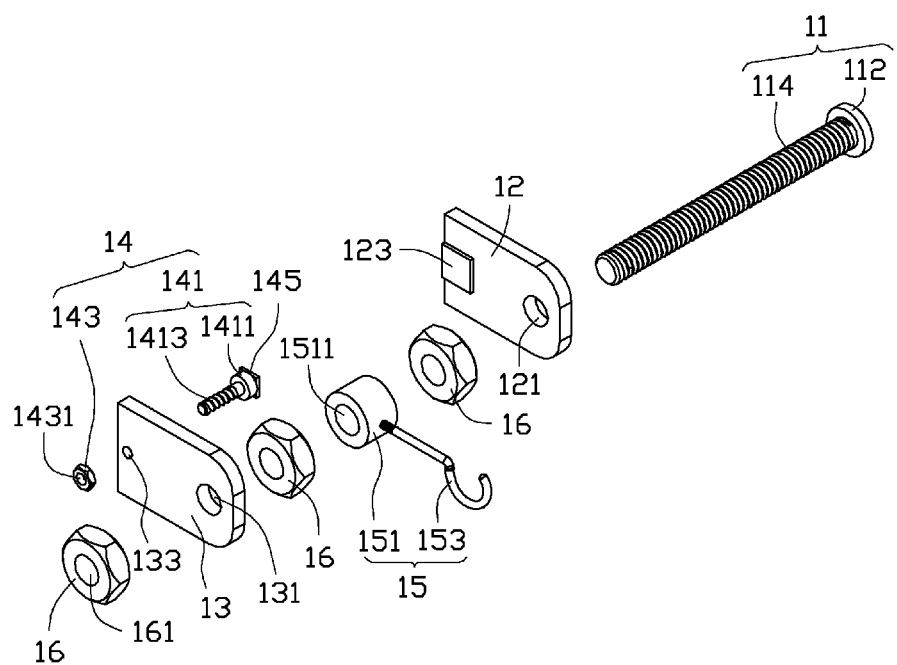
FIG. 2 is an exploded, isometric view of a securing member assembly of the testing apparatus of FIG. 1.

Referring to FIGS. 1 and 2, a testing apparatus in accordance with an embodiment includes a securing member assembly 10 and a tension meter 20. In one embodiment, the testing apparatus is used to test an electronic device 30. The electronic device 30 includes a first side plate 31 and a second side plate 32 opposite to the first side plate 31. For example, the electronic device 30 may be a personal computer, and the first side plate 31 is made of steel.

The securing member assembly 10 includes a securing member 11, a first clipping panel 12, a second clipping panel 13, a positioning member 14, a sliding member 15, and three mounting members 16. The second clipping panel 13 is substantially parallel to the first clipping panel 12. The securing member 11 includes a head 112 and a screw pole 114 connected to the head 112. The head 112 is round, and a diameter of the head 112 is greater than a diameter of the screw pole 114.

The first clipping panel 12 defines a first through hole 121, and a first plastic gasket 123 is attached to the first clipping panel 12. In one embodiment, the first plastic gasket 123 is a rectangle, the first through hole 121 is round, and a diameter of the first through hole 121 is less than a diameter of the head 112.

A second through hole 131 and a positioning hole 133 are defined in the second clipping panel 13. The second through hole 131 and the positioning hole 133 are round, and a diameter of the positioning hole 133 is less than a diameter of the second through hole 131.

The positioning member 14 includes a positioning portion 141 and a nut 143. The positioning portion 141 includes a positioning head 1411 and a screw post 1413 connected to the positioning head 1411. A second plastic gasket 145 is attached to the positioning head 1411. A screw hole 1431, corresponding to the screw post 1413, is defined in the nut 143. In one embodiment, the positioning head 1411 is round, and the second plastic gasket 145 is a rectangle. An area of the second plastic gasket 145 is greater than an area of the positioning head 1411, and the positioning head 1411 can be covered by the second plastic gasket 145.

The sliding member 15 includes a sliding portion 151 and a clipping portion 153, such as a hook, extending from an outer surface of the sliding portion 151. A receiving hole 1511 is defined in the sliding portion 151. In one embodiment, the sliding portion 151 is a cylinder.

Each of the three mounting members 16 defines a mounting hole 161, corresponding to the screw pole 114. The tension meter 20 includes a hook 21 can be engaged with the clipping portion 153.

Figure 3:
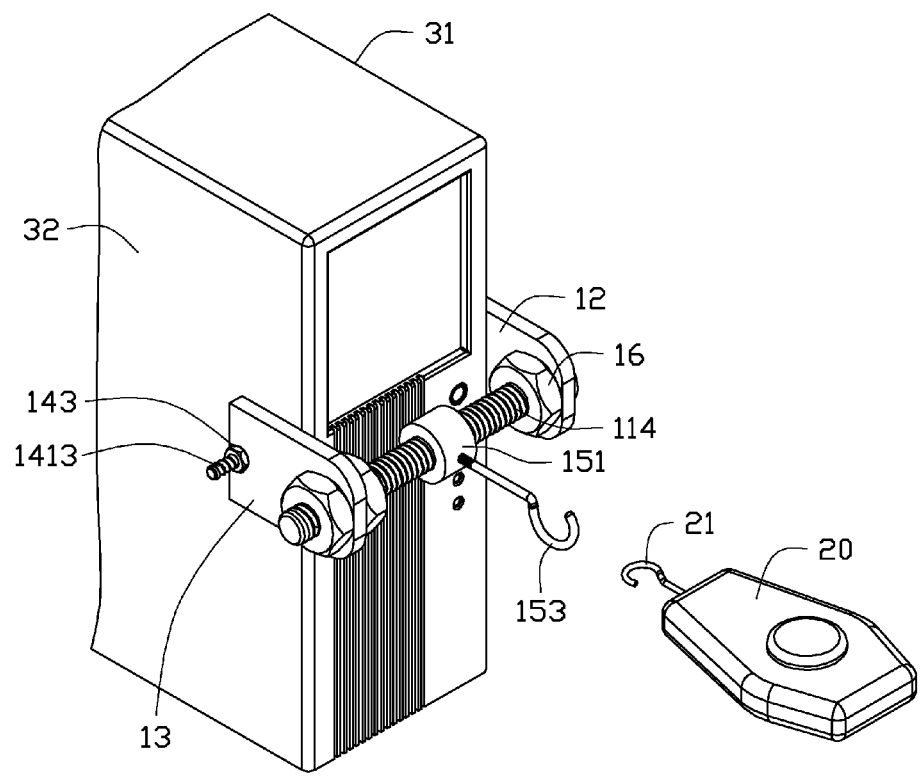
FIG. 3 is an assembled view of FIG. 1.
Figure 4:
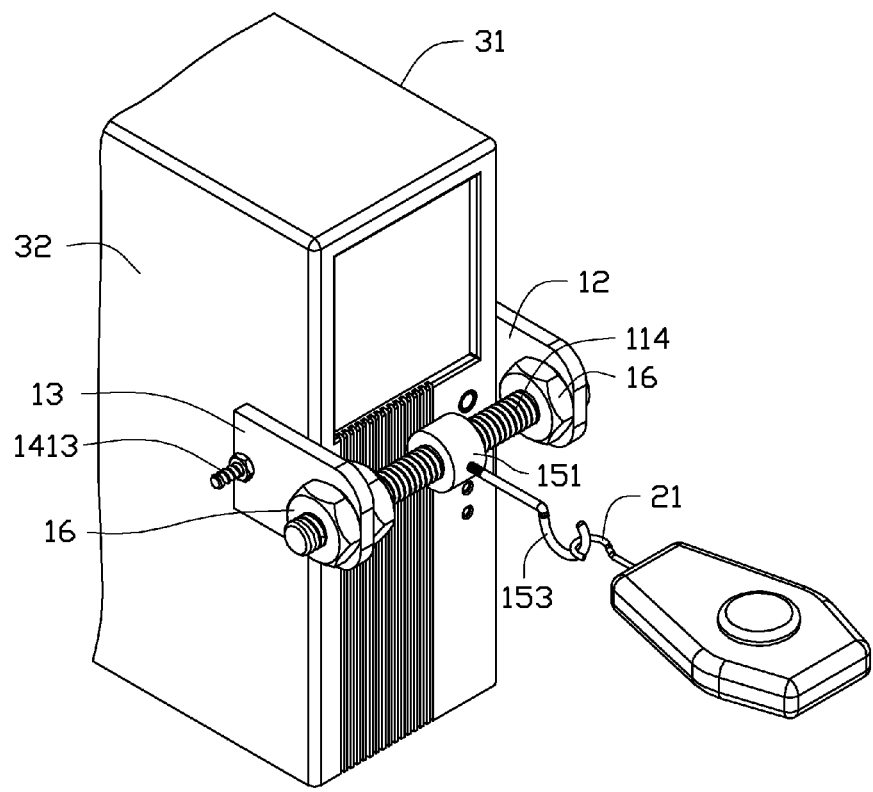
FIG. 4 is similar to FIG. 3, but showing a testing state.

Referring to FIG. 3, in assembly, the screw pole 114 extends through the first through hole 121 to secure the first clipping panel 12 to the screw pole 114. The first clipping panel 12 is moved towards the head 112 until the first clipping panel 12 is attached to the head 112. One of the three mounting members 16 is engaged with the screw pole 114 and attached to the first clipping panel 12, for preventing the first clipping panel 12 from moving. The screw pole 114 extends through the receiving hole 1511, and the sliding portion 151 is moveably secured to the screw pole 114.

The second clipping panel 13 is secured to the screw pole 114 by two of the three mounting members 16. At this point, the sliding member 15 is located between the first clipping panel 12 and the second clipping panel 13. The screw post 1413 extends through the positioning hole 133, and the nut 143 is engaged with the screw post 1413, to secure the positioning member 14 to the second clipping panel 13.

In use, the two of the three mounting members 16 are detached from the second clipping panel 13. The first plastic gasket 123 is attached to the first side panel 12. One of the three mounting members 16 is engaged with the screw pole 114, and the second clipping panel 13 is engaged with the screw pole 114. The second clipping panel 13 is moved towards the second side panel 32, until the second plastic gasket 145 is attached to the second side panel 32. The other mounting member 16 is attached to the second side panel 32 and engaged with the screw pole 114, for preventing the second clipping panel 13 from moving away from the second side panel 32. Therefore, the first clipping panel 12 and the second clipping panel 13 can sandwich the electronic device 30 therebetween. The sliding member 15 is slid until a distance between the sliding portion 151 and the first clipping panel 12 is equal to a distance between the sliding portion 151 and the second clipping panel 13. The hook 21 is engaged with the clipping portion 153. The tension meter 20 is moved in a direction substantially perpendicular to the screw pole 114, and the electronic device 30 is moved relative to a testing desk. Therefore, a vibration absorbing plastic gasket (not shown) attached to a bottom surface of the electronic device 30, can be tested.

In an embodiment, a first coefficient of friction between a plastic and a wood is 0.6, and a second coefficient of friction between the plastic and a steel is 0.45. A weight of the electronic device 30 is about 20 kg, and the first coefficient of friction, between a plastic vibration absorbing plastic gasket and the wood testing desk, is 0.6. Thus, a tension $F \geq Nu = 20 \times 9.8 \times 0.6N = 117.6N$, and the tension can move the electronic device 30. The second coefficient of friction, between the first plastic gasket 123 and the first side plate 31, and the second plastic gasket 145 and the second side plate 32, is 0.45, so a pressure $f \geq F/2u = 117.6N/(2 \times 0.45) = 130.7N$. Therefore, the pressure f is greater than the tension F, and the first clipping panel 12 cannot be disengaged from the first side plate 31, and the second clipping panel 13 cannot be disengaged from the second side plates 32 when the electronic device 30 is pulled.

In disassembly, the nut 143 is disengaged from the second clipping panel 13. The second clipping panel 13 is removed from the second side plate 32, and the electronic device 30 can be detached from the securing member assembly 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A testing apparatus comprising:
    a securing member comprising a screw pole;
    a first clipping panel secured to the screw pole;
    a second clipping panel moveably attached to the screw pole; and the first clipping panel and the second clipping panel being adapted to be attached to opposite side plates of an electronic device;
    two mounting members attached to the screw pole and located on opposite sides of the second clipping panel, the two mounting members are configured to prevent the second clipping panel from disengaging from the electronic device; and
    a sliding member slidably attached to the screw pole and located between the first clipping panel and the second clipping panel, the sliding member is adapted to move the electronic device.

2. The testing apparatus of claim 1, wherein the first clipping panel is substantially parallel to the second clipping panel.

3. The testing apparatus of claim 1, wherein the securing member further comprises a head connected to the screw pole, and the first clipping panel abuts the head.

4. The testing apparatus of claim 3, wherein a first plastic gasket is attached to the first clipping panel, and the first plastic gasket is adapted to adhere to the electronic device.

5. The testing apparatus of claim 4, wherein the first clipping panel defines a first through hole, the first through hole is configured to receive the screw pole, the first through hole is located on a first end of the first clipping panel, and the first plastic gasket is located on a second end opposite to the first end of the first clipping panel.

6. The testing apparatus of claim 4, wherein the first through hole and the head are round, and a diameter of the first through hole is greater than a diameter of the screw pole and less than a diameter of the head.

7. The testing apparatus of claim 1, wherein a positioning member is attached to the second clipping panel, and a second plastic gasket is attached to the positioning member, the second plastic gasket being configured to attach to the electronic device.

8. The testing apparatus of claim 7, wherein the positioning member comprises a positioning portion and a screw post connected to the positioning portion, the positioning portion comprises a positioning head, the screw post is engaged with the second clipping panel, and the second plastic gasket is covered on the positioning head.

9. The testing apparatus of claim 1, wherein the sliding member comprises a sliding portion slidably attached to the screw pole, and the sliding portion is a cylinder.

10. The testing apparatus of claim 9, further comprising a tension meter, and the tension meter comprising a hook, wherein the sliding member comprises a clipping portion to engage with the hook, and the clipping portion being extended from an outer surface of the sliding portion.

11. A testing apparatus comprising:
    a securing member comprising a screw pole;
    a first clipping panel secured to the screw pole;
    a second clipping panel moveably attached to the screw pole;
    two mounting members attached to the screw pole; and
    a sliding member slidably attached to the screw pole and located between the first clipping panel and the second clipping panel, the sliding member is adapted to move an electronic device;
    wherein the second clipping panel is moveable relative to the first clipping panel thereby positioning the electronic device between the first clipping panel and the second clipping panel, and the two mounting members are located on opposite sides of the second clipping panel, the two mounting member are configured to prevent the second clipping panel from moving relative to the first clipping panel.

12. The testing apparatus of claim 11, wherein the first clipping panel is substantially parallel to the second clipping panel.

13. The testing apparatus of claim 11, wherein the securing member further comprises a head connected to the screw pole, and the first clipping panel abuts the head.

14. The testing apparatus of claim 13, wherein a first plastic gasket is attached to the first clipping panel, and the first plastic gasket is adapted to adhere to the electronic device.

15. The testing apparatus of claim 14, wherein the first clipping panel defines a first through hole, the first through hole is configured to receive the screw pole, the first through hole is located on a first end of the first clipping panel, and the first plastic gasket is located on a second end opposite to the first end of the first clipping panel.

16. The testing apparatus of claim 14, wherein the first through hole and the head are round, and a diameter of the first through hole is greater than a diameter of the screw pole and less than a diameter of the head.

17. The testing apparatus of claim 11, wherein a positioning member is attached to the second clipping panel, and a second plastic gasket is attached to the positioning member, the second plastic gasket being configured to attach to the electronic device.

18. The testing apparatus of claim 17, wherein the positioning member comprises a positioning portion and a screw post connected to the positioning portion, the positioning portion comprises a positioning head, the screw post is engaged with the second clipping panel, and the second plastic gasket is covered on the positioning head.

19. The testing apparatus of claim 11, wherein the sliding member comprises a sliding portion slidably attached to the screw pole, and the sliding portion is a cylinder.

20. The testing apparatus of claim 19, further comprising a tension meter, and the tension meter comprising a hook, wherein the sliding member comprises a clipping portion to engage with the hook, and the clipping portion being extended from an outer surface of the sliding portion.

\* \* \* \* \*